United States Patent [19]

Norfolk

[11] Patent Number: 4,633,998
[45] Date of Patent: Jan. 6, 1987

[54] CONVEYOR SYSTEM

[75] Inventor: Michael P. Norfolk, Ottley, England

[73] Assignee: Santrade Limited, Lucerne, Switzerland

[21] Appl. No.: 615,147

[22] Filed: May 30, 1984

[30] Foreign Application Priority Data

Jun. 3, 1983 [GB] United Kingdom ............ 8315232

[51] Int. Cl.⁴ .................................... B65G 37/00
[52] U.S. Cl. ........................... 198/465.3; 198/803.2; 198/681
[58] Field of Search ............... 198/473, 795, 472, 681, 198/465.3, 803.2

[56] References Cited

U.S. PATENT DOCUMENTS

| | | | |
|---|---|---|---|
| 3,102,153 | 8/1963 | Stieler et al. | 198/795 |
| 3,583,549 | 6/1971 | Hershey, Jr. | 198/472 |
| 4,184,586 | 1/1980 | Dimmock et al. | 198/795 |

FOREIGN PATENT DOCUMENTS

| | | | |
|---|---|---|---|
| 0721120 | 11/1965 | Canada | 198/473 |
| 1035884 | 7/1966 | United Kingdom . | |
| 1336656 | 11/1973 | United Kingdom . | |
| 0540780 | 12/1976 | U.S.S.R. | 198/472 |

OTHER PUBLICATIONS

"Automatic Rack Bread Cooler", Data Sheet 311, Baker Perkins Ltd., Peterborough, England.
An official letter from the U.K. Patent Office, Jul. 24, 1985, w/an enclosure letter from Mr. Boutland to the U.K. Patent Office dated Jul. 5, 1985.
Sketches "N, O and P", with descriptions of same, and parts of drawings D and G, enclosed with the Boutland letter, 7/5/85.

Primary Examiner—Robert J. Spar
Assistant Examiner—D. Glenn Dayoan
Attorney, Agent, or Firm—Burns, Doane, Swecker & Mathis

[57] ABSTRACT

A conveyor system with upper and lower runs carrying racks for articles dispenses with the usual conveyors for moving the racks along the runs. Instead, the racks are stacked along the runs, and vertical conveyors at the ends of the runs transport the racks between the runs and impel them along the run to which they have been conveyed.

9 Claims, 6 Drawing Figures

CONVEYOR SYSTEM

TECHNICAL FIELD

This invention relates to a new form of conveyor system, which is particularly intended for use in the production of bread, notably in autoprovers and coolers, though the general principle is not confined to these applications. More specifically the invention relates to conveyor systems in which racks carrying the articles to be conveyed are moved in one direction along a forward pass and then in the opposite direction along a reverse pass above or below the forward pass.

BACKGROUND OF THE INVENTION

In the past a bread cooling system of this type has been operated by two conveyor chains which run the length of the apparatus, one conveyor being located at each side of the line of racks carrying the bread. The conveyor chains carry rack control arms—one for each side of each rack—projecting at right angles to the conveyor. A spigot projecting from each side of each rack passes through a longitudinal slot in the rack control arm and carries at its end a roller which runs on a rail along the conveyor.

The system outlined above has certain disadvantages. In the first place the long conveyor chains require a considerable amount of take-up facility. Secondly the rack control arms, when they are at the ends of the conveyors and the chain links to which they are attached are rounding the sprockets, give heavy loadings on the chains, magnifying the effects of clearance in the chains and between the chains and sprockets. Furthermore, in order to provide vertical movement to the racks at the end of the conveyor where loading and unloading takes place, the spigots on the racks move along the slots during this movement, and this in turn means that a constant sprocket speed produces a faster rack movement at the top and bottom of its vertical run: this makes loading and unloading more difficult. Moreover, as the control arms of necessity project outwardly beyond the racks at the ends of the conveyor, as the chains are passing round the sprockets, any conveyors operating at right angles to the cooler conveyor for the purpose of loading or offloading the cooler conveyor must be placed outside the path of travel of the control arms. This means that both loading and unloading requires a two-stage loader and unloader.

SUMMARY OF THE INVENTION

The object of the present invention is to provide a conveyor in which the above disadvantages are largely or wholly alleviated or eliminated.

The invention provides a conveyor system in which racks are mounted to travel in succession along rails on upper and lower passes, vertically operating conveying means being employed to convey each rack from one pass to another and, after conveyance of a rack to the level of the new pass, to impel it towards the other conveying means.

The conveying means may comprise endless conveyors carrying abutment members which contact an element on each rack in order to propel it forwards. At the downstream end of the upper run these abutment members may be U-shaped, with the leading arm of the U shorter than the other arm, the elements on the rack being supported in their downward movement by lying in the valley of the U.

BRIEF DESCRIPTION OF THE DRAWINGS

One form of the invention will now be described in greater detail with reference to the accompanying drawings, wherein.

DETAILED DESCRIPTION

Figure 1:
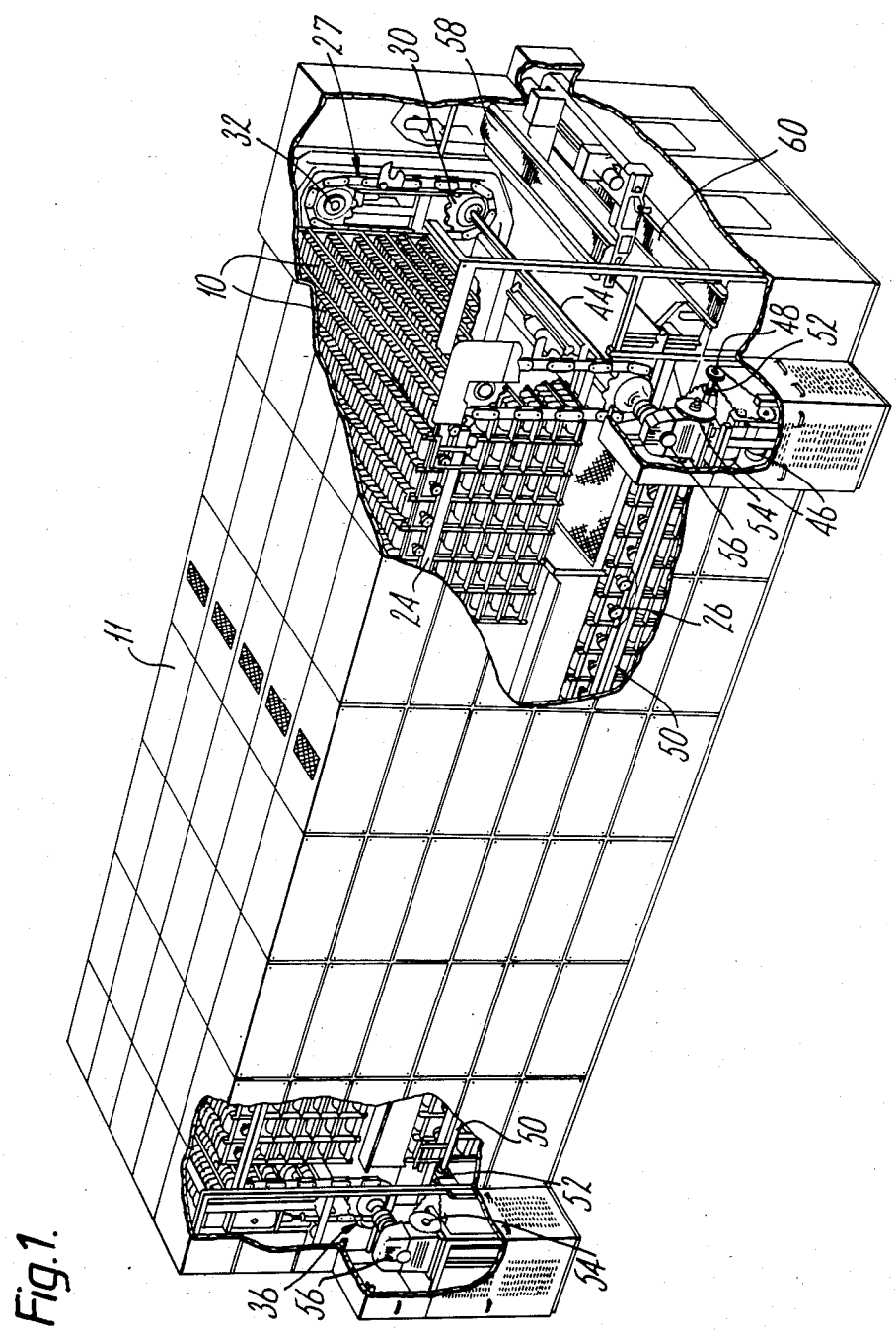
FIG. 1 is a perspective view of the conveyor system, as used in a bread cooler, with parts broken away to give an impression of the whole mechanism.

The conveyor system illustrated forms part of a bread cooler, though the apparatus for supplying the cooling currents of air is not shown in the drawings, this forming no part of the conveyor system, the subject of the invention.

FIG. 1 shows the complete system with parts of the casing 11 and other elements cut away and removed to show the system more clearly. A series of racks 10, each of which accommodates a number of shelves 12 for the material to be conveyed, in this case bread, is moved along a path travelling from left to right (as seen in the drawing) along an upper run of the conveyor system and from right to left along a lower run.

Figure 5:
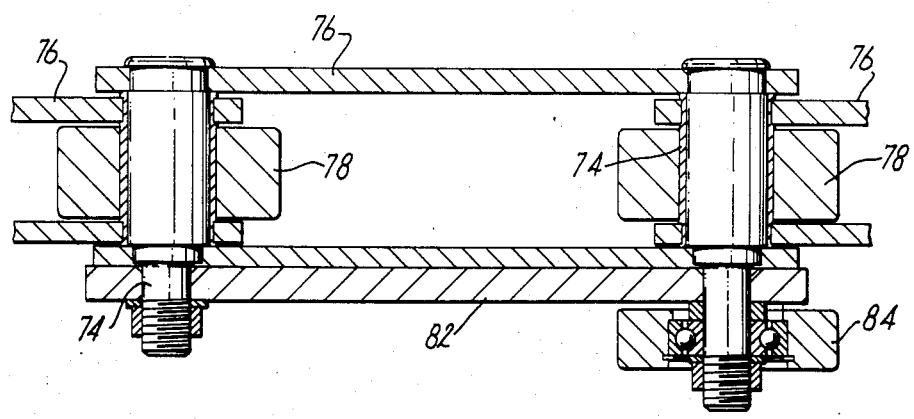
Figure 6A:
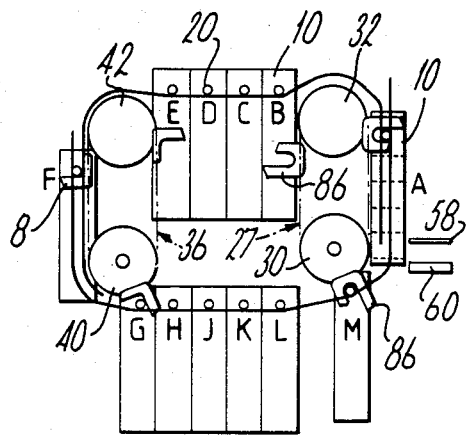
FIG. 6a-f is a diagram illustrating the operation of the system of the present invention.
Figure 6B:
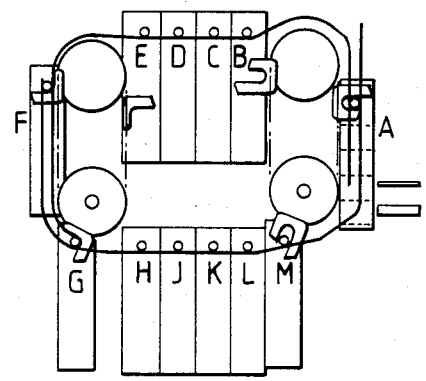
Figure 6C:
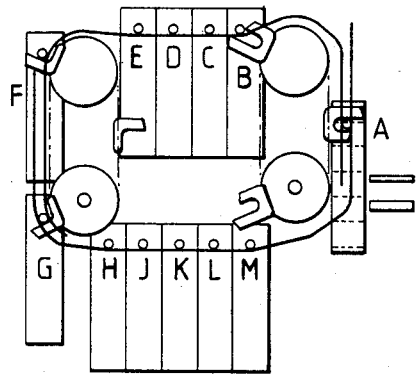
Figure 6D:
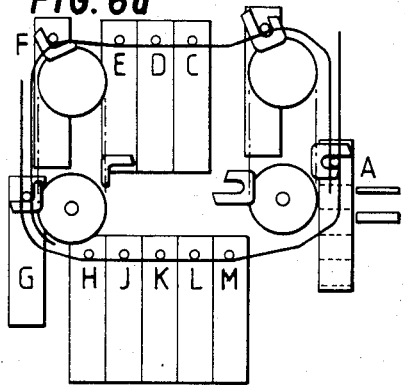
Figure 6E:
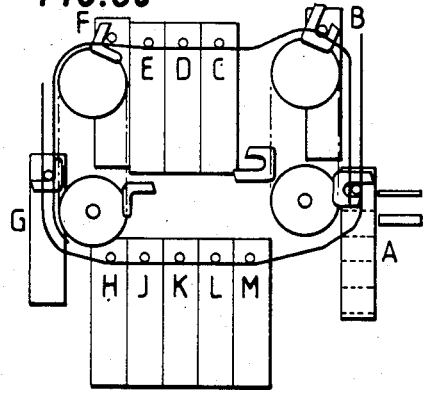
Figure 6F:
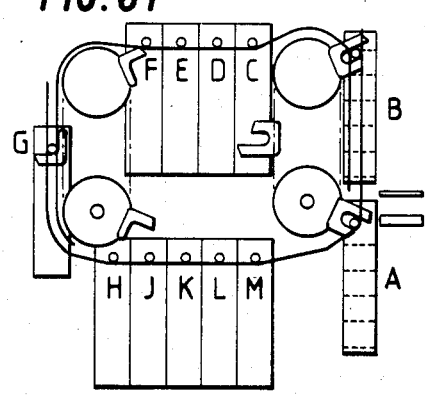

Each of the racks 10 is provided on each side with a side cheek 14 at its upper end, each cheek having mounted thereon a spigot 16 carrying (as best seen in FIG. 5) a flanged wheel 18 and a roller 20, both mounted to rotate on roller bearings 22.

The rollers 20 of the racks 10 travel along a track, the track of the upper run comprising a rail 24 for the greater part of its length, whilst the lower track comprises a rail 26. As can be seen in the drawings, the racks 10 are in contact with each other along both the upper and lower runs and indeed are moved along these runs as a result of being pushed by succeeding racks 10.

At the downstream end of the upper run of the conveyor system lie two vertical chain conveyors 27, for the purpose of transferring the racks from the upper run to the lower run in a manner which will be explained later. Each of the chain conveyors comprises an endless chain 28 running between a lower sprocket 30 and an upper sprocket 32. Slack in the chain is taken up by a jack 34.

At the other end of the conveyor system is a further pair of chain conveyors 36 comprising a chain 38 round a lower sprocket 40 and an upper sprocket 42. Another jack 34 at this end takes up the slack in the chain 38.

The lower sprockets 30 are mounted on a common shaft 44 and the lower sprockets 40 are similarly mounted on a common shaft (not seen in the drawings). The conveyors are driven simultaneously from electric motors 46, connected by chain drive to a sprocket 48 mounted on a lay shaft 50 which runs the length of the conveyor system. Mounted at each end of the lay shaft 50 is a further sprocket 52, each connected by chain to a larger sprocket 54; these sprockets 54 drive the lower sprockets 30 and 40 respectively through gearing contained in casings 56.

At the right-hand end of the conveyor system are located an unloader conveyor 58 and a loader conveyor 60, both transverse to the direction in which the racks 10 move along their upper and lower runs. In the particular application described, that is to say for a bread cooler, a single stage unloader off-loads the bread from one of the shelves 12 whilst simultaneously a two-stage loader is loading bread onto a lower shelf 12. The loader and unloader operate on the instructions of a timing cam on the shaft 44; they are of normal construction and form no part of this invention.

Figure 3:
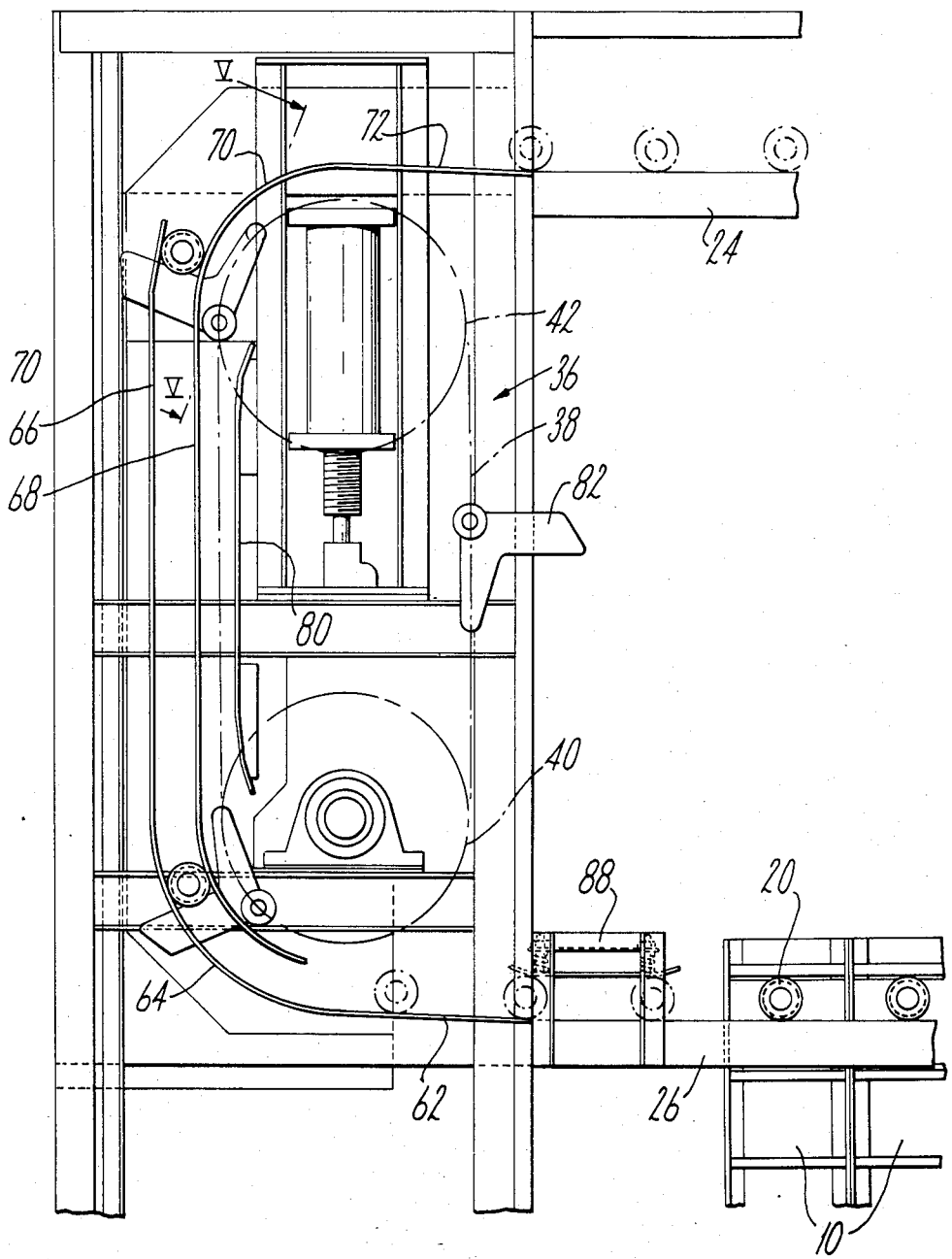
FIG. 3 is a similar side view of the other end.

At the left-hand end of the apparatus seen in FIG. 3, the lower track 26 is formed with a slight upward slope along the section marked 62, whereafter the track for the rollers 20 curves upwardly at 64 along a part-circular path with its centre on the axis of the sprocket 40, finally forming a vertical path 66. During their vertical movement the rollers 20 run between the vertical track 66 and an inner track member 68 which is parallel to the track 66 and which at its upper end curves round to form a part-circular path 70, substantially on the axis of the upper sprocket 42 leading to a downwardly sloping section 72 onto the horizontal upper track 24.

Figure 4:
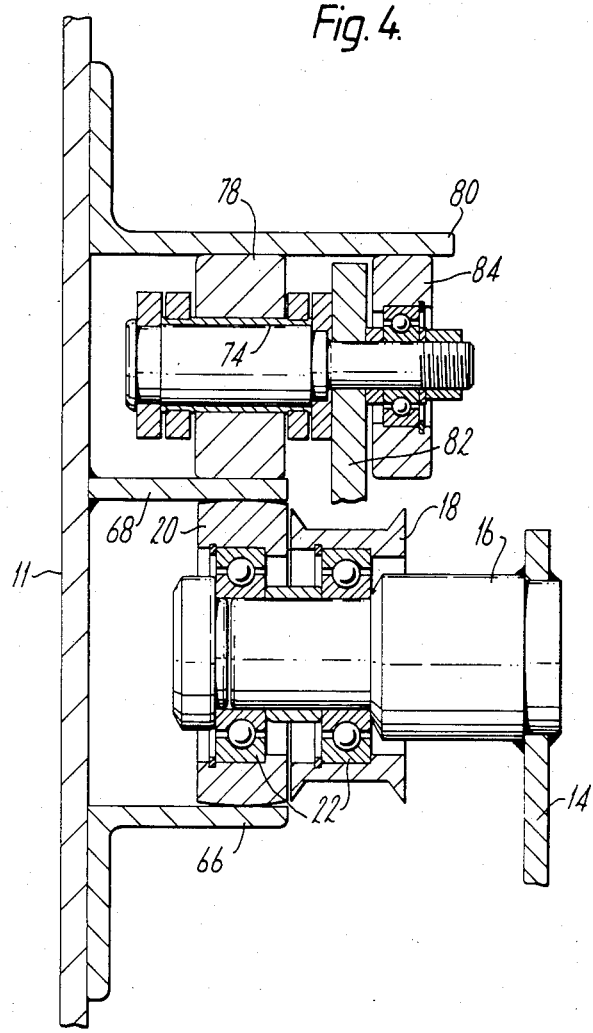
FIGS. 4 and 5 are sections respectively on the lines IV—IV in FIG. 2 and V—V in FIG. 3.

As seen in FIGS. 4 and 5, the pins 74 which connect the links 76 of the chain conveyors 36 carry intermediate rollers 78 which are guided in their upward path between the inner side of the member 68, the outer side of which forms the inner track for the rollers 20 and another vertical member 80. At three equidistant points on the chain 38 an L-shaped member 82 is mounted on adjacent pins 74. These L-shaped members 82 at the bottom of their run abut the flanged wheel 18 mounted on the spigot 16 of a rack 10 lying underneath the lower sprocket 40, thus carrying the rack up to the top run, during which movement the rollers 20 are running between the tracks 66 and 68. As the L-shaped member 82 is offset from the rollers 78, the pin 74 beyond the L-shaped member 82 is provided with an additional roller 84 which runs against the member 80 and counters the twisting load on the chain.

Once a rack 10 has been conveyed up to the top of the chain conveyor 36 it abuts the row of racks 10 on the upper run, whereupon the L-shaped member 82 pushes the whole line of racks 10 towards the right-hand end of the conveyor.

Figure 2:
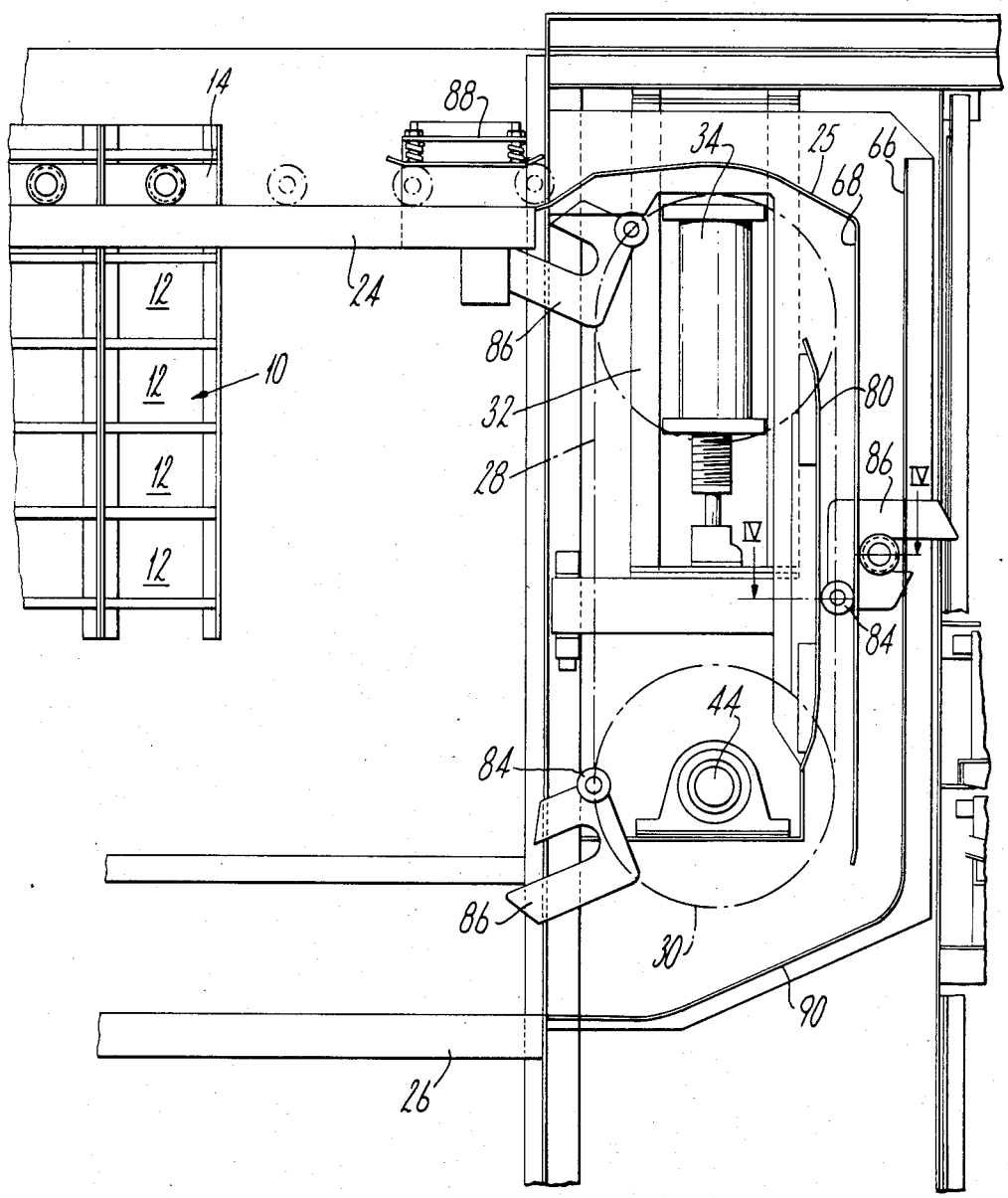
FIG. 2 is a side view of the right-hand end of the mechanism (as seen in FIG. 1) omitting the casing and drive for the conveyor.

The right-hand end of the conveyor system seen in FIG. 2 is essentially the same as the left-hand end, with the exception that the member carried on the conveyor chains, in this case numbered 86 instead of being L-shaped is U-shaped, with one arm of the U longer than the other arm. The longer arm of the U catches the flanged wheel 18 of a rack 10 lying at the end of the upper run and locates this wheel in the valley formed by the arms of the U, holding it in this position during the downward movement of the rack 10 towards the lower run. On reaching the lower run the rack 10 is propelled towards the line of racks lying on the lower run whilst still lying in the valley formed by the arms of the U. As the U-shaped member 86 is carried upward round the lower sprocket 30 the short arm of the U moves out of the path of the rack 10 which is propelled, together with all the other racks on the lower run, towards the left-hand end of the apparatus. It will be observed that the upper track 24 runs into a dome-shaped track 25 above the upper sprocket 32 and this merges into the vertical inner track 68, whereas the outer track 66 curves round at 90 to lie level with the lower track 26 forming the lower run for the rollers 20 of the rack 10. Additional rollers 84 associated with the U-shaped members 86 have exactly the same function as at the other end of the conveyor, as has the member 80. At the end of each of the upper and lower runs a brake member 88 ensures the bunching of the racks 10 so that these do not rattle or roll forward due to any surge on the line of racks behind them.

A simplified diagram of the system is shown in FIG. 6a-f where the racks are marked successively A to M. As can readily be seen from this figure the various stages a to f show the rack A, which has six shelves 12, in the successive loading position for each of the shelves. In each of the stages a to f, the rack A is being supported by the short arm of the U-shaped member 86 during its downward passage from the upper pass to the lower pass. On the other hand, as the rollers 20 of the racks 10 reach the curved track 90 forming the introduction to the lower run of the conveyor, it is the long arm of the U-shaped member 86 which impels each rack forwardly along the lower pass, moving the whole line of racks forward along the conveyor system towards the chain conveyors 36. This is best seen for the rack M where at stage a the rack is supported by the sloping portion of track 90 whilst the flanged wheel 18 is still within the valley between the U-shaped arms. At position b the rack M has been caused to abut the rack L and move that rack and the other racks on the lower pass a slight distance along the pass. At position c the rack M has been moved still further and the U-shaped arm has just gone out of contact with the wheel 18 on the rack M. In this position the line of racks, designated H, J, K, L and M, is in such position that the rack H will be contacted and lifted by the next L-shaped member 86 of the chain conveyors 36. As can be seen for the rack G in the successive stages a to f, one arm of the L-shaped member 82 catches the rack, lifts it up, and impels it on the upper pass towards the right-hand conveyor 27.

It is to be understood that the present invention may be embodied in other specific forms without departing from the spirit or essential characteristics of the present invention. The preferred embodiment is therefore to be considered illustrative and not restrictive. The scope of the invention is indicated by the appended claims rather than by the foregoing descriptions and all changes or variations which fall within the meaning and range of the claims are therefore intended to be embraced therein.

What is claimed is:

1. A transportation system comprising upper and lower rails forming upper and lower passes for the system, racks carried in line on the rails and lying in juxtaposed relationship, an upper sproket located at a downstream end of said upper pass, a lower sprocket, first vertically operating endless conveying means mounted on said upper and lower sprockets so that said endless conveying means is movable along a path, first abutment members on said first conveying means, each first abutment member being U-shaped with arms of the U-shape being of different length, the shorter arms forming a ledge to support elements on successive racks and to carry the racks from the upper pass to the lower pass and the longer arms forming a projection which, as the first abutment member goes around said lower sprocket, impels the rack carried by the abutment members against the line of the racks on the lower rails and toward the downstream end of the lower pass, said endless conveying means moving said first abutment members along an upwardly inclined portion of said path into engagement with elements on successive racks positioned at said downstream end of said upper pass, said upwardly inclined path portion being spaced from said downstream end of said upper pass so that as each first abutment member moves along said path portion, said shorter arm passes by said element on the successive rack without engaging said element and said longer arm engages said element, second vertically operating endless conveying means located at the downstream end of the lower pass, and second abutment members on said second conveying means, said second abutment members forming a projecting ledge to support elements on successive racks to carry the racks from the lower pass to the upper pass and impel each such rack against the line of racks on the upper rails and toward the downstream end of the upper pass.

2. The transportation system according to claim 1, wherein said first and second endless conveying means include chain conveyors and the abutment members are carried between adjacent pins connecting links in the chain conveyors, said pins being extended in order to receive the abutment members, and the pin at one end of the abutment member further carrying a roller for abutting a fixed member on the transportation system so to counter the twisting load on the chain.

3. The transportation system according to claim 1, wherein said element on each rack is a wheel mounted to rotate on a spigot projecting from the rack.

4. The transportation system according to claim 3, wherein said spigot also carries a roller on which the rack travels on its upper and lower runs.

5. The transportation system according to claim 1, wherein said shorter arms precede said longer arms, said first conveying means approaching said upper sprocket from a substantially vertical direction of travel.

6. The transportation system according to claim 5, wherein said element on each rack is a wheel mounted to rotate on a spigot projecting from the rack.

7. The transportation system according to claim 6, wherein said spigot also caries a roller on which the rack travels on its upper and lower runs.

8. The transportion system according to claim 5, wherein said first and second endless conveying means include chain conveyors and the abutment members are carried between adjacent pins connecting links in the chain conveyors, said pins being extended in order to receive the abutment members, and the pin at one end of the abutment member further carrying a roller for abutting a fixed member on the transportation system so to counter the twisting load on the chain.

9. A transportation system comprising upper and lower rails forming upper and lower passes for the system, racks carried in line on the rails and lying in juxtaposed relationship, an upper sprocket located at a downstream end of said upper pass, a lower sprocket, first vertically operating endless conveying means mounted on said upper and lower sprockets, first abutment members on said first conveying means, each first abutment member being U-shaped with arms of the U-shape being of different length, the smaller arms forming a ledge to support elements on successive racks and carry the racks from the upper pass to the lower pass and the longer arms forming a projection which, as the first abutment member goes around said lower sprocket, impels the rack carried by the abutment members against the line of racks on the lower rails and toward the downstream end of the lower pass, second vertically operating endless conveying means located at the downstream end of the lower pass, and second abutment members on said second conveying means, said second abutment members forming a projecting ledge to support elements on successive racks to carry the racks from the lower pass to the upper pass and impel each such rack against the line of racks on the upper rails and toward the downstream end of the upper pass;

said shorter arms preceding said longer arms, said first conveying means approaching said upper sprocket from a substantially vertical direction of travel;

the upper rails terminating at their downstream end in a dome-shaped track, so positioned that a rack reaching a bottom of the dome-shaped track can be contacted and carried forward by the longer arm of one of the first abutment members.

* * * * *